Sept. 16, 1969  J. LA TORRE  3,467,157
FASTENER HAVING INTERFERENCE THREAD FORMING
MEANS ASSOCIATED THEREWITH
Filed March 23, 1967  2 Sheets-Sheet 1

INVENTOR
JACK LA TORRE
BY
MAHONEY & HORNBAKER
ATTORNEYS

Sept. 16, 1969   J. LA TORRE   3,467,157
FASTENER HAVING INTERFERENCE THREAD FORMING
MEANS ASSOCIATED THEREWITH
Filed March 23, 1967   2 Sheets-Sheet 2
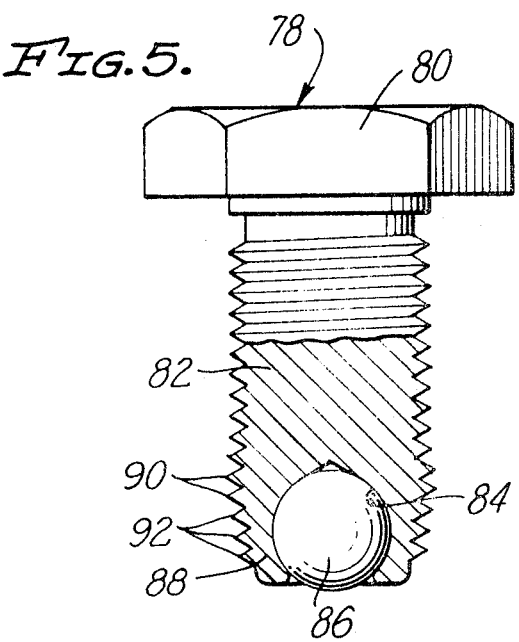
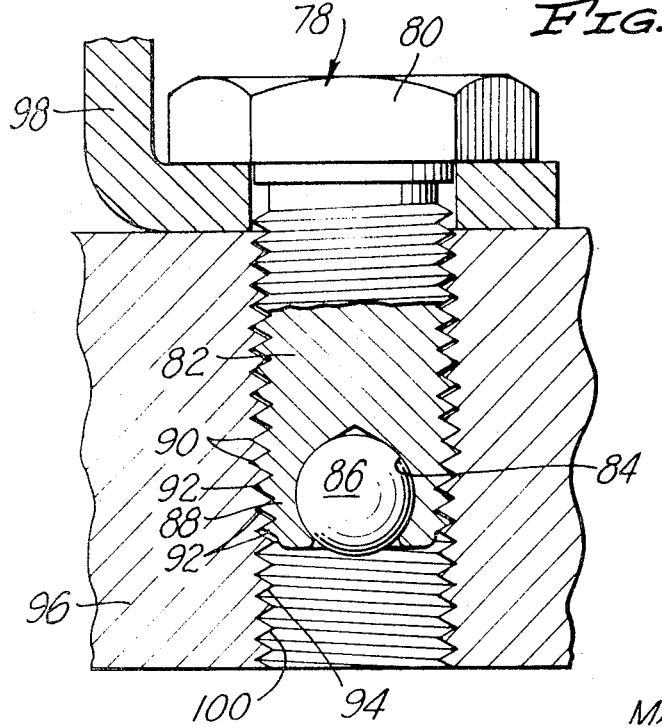
INVENTOR
JACK LA TORRE
BY
MAHONEY & HORNBAKER
ATTORNEYS United States Patent Office 3,467,157
Patented Sept. 16, 1969

3,467,157
FASTENER HAVING INTERFERENCE THREAD FORMING MEANS ASSOCIATED THEREWITH
Jack La Torre, Naples, Calif., assignor of thirty-three and one-third percent to Thomas P. Mahoney, Malibu, Calif.
Filed Mar. 23, 1967, Ser. No. 625,532
Int. Cl. F16b *39/30, 39/16, 39/34*
U.S. Cl. 151—14                                     4 Claims

ABSTRACT OF THE DISCLOSURE

A fastener having a threaded shank engaged in the threaded bore of a member, said fastener shank having a zone of radially expanded threads in interference with and securing the fastener in the member threaded bore. The fastener interference threads are formed by a spherical expander received in an entering end recess of the fastener shank, said expander being automatically operable during threaded engagement between the fastener shank and member, or being operable and removed from the fastener prior to the fastener shank being threadably engaged with the member.

---

This invention relates to a fastener having interference thread forming means associated therewith and, more particularly, to a fastener threadably engaged in a member bore wherein, during the latter stages of threading said fastener into said fastener bore, a part of the fastener threads are expanded into interference with the member threads so that said fastener is permanently retained in said member bore. Even more particularly, this invention relates to a fastener of the foregoing type having unique and automatically operable interference thread forming means associated directly therewith so that said fastener may be threaded into a member bore in the conventional manner and said interference thread forming means will be automatically actuated during the latter stages of said threading for producing the interference between the fastener threads and the member threads.

Various forms and shapes of fasteners are threadably received engaged in the bores of various types of members wherein, although it is desired to permanently retain the particular fastener in the member bore, the particular situation does not permit the fastener to extend through the member so that the end thereof can be secured by a nut or some other securing means. For instance, a stud or bolt may be received in a blind member bore or received in a through member bore wherein the particular structure does not permit the end of the stud of bolt to project from the opposite side of said member. At the same time, due to the particular service conditions of the stud or bolt, if some form of permanent securing means is not provided, the stud or bolt will ultimately work loose and free from threaded engagement with the member, or later required manipulation of the stud or bolt cannot be properly carried out if it is possible to back off the stud or bolt from full threaded engagement with the member.

Consider the situation of a stud threadably engaged with a member and having a fastening portion projecting therefrom, which fastening portion must later receive a second member thereover and then be threadably engaged by a nut. The usual procedure would be to first install the stud in the member, with the fastening portion projecting therefrom, engage such fastening portion through the second member and threadably engage the nut over the fastening portion. If the stud threads are formed in the same rotational direction as the fastening portion threads, the latter ultimately receiving the nut, it is possible to not only tightly secure the stud with the member, but also to tightly engage the nut therewith over the second member.

The difficulty comes, however, when it is desired to remove the nut and the second member from the stud fastening portion without backing out or removing the stud from the first member, since the rotational direction for removing the nut from the stud fastening portion is the same rotational direction for removing the stud from the first member. The practical result is that when it is attempted to remove the nut from the stud fastening portion, it is never known when the reverse threading of the nut is commenced whether the nut will reversely thread relative to the stud fastening portion or whether the stud will reversely thread relative to the first member, and there are many occasions where removal of the stud from the first member may be quite damaging to the particular structure or at least highly inconvenient.

Also, consider the situation in which a stud or bolt is threadably engaged in a member bore and fastens something to said member. Where the service conditions are such that the member may be subjected to vibrating conditions, there is an apparent possibility that such vibrational conditions will cause the stud or bolt to work loose, reversely threading from the member and ultimately cause complete separation. The obvious consequences, of course can be quite disastrous.

It is, therefore, an object of my invention to provide a fastener having interference thread forming means associated therewith wherein, once the fastener has been threadably engaged in a member bore, there is no possibility of accidental dislodgement therefrom. According to the principles of the present invention, the interference produced between the threads of the fastener and the member may be such that an extreme force is required to reversely thread the fastener relative to the member, that is, a far greater force than that required to originally thread the fastener in the member bore. In many, if not most, instances it will be desirable to provide sufficient interference between the fastener and member threads that the fastener is permanently retained in the member bore and it will be impossible to remove the fastener from the member without complete destruction of one or the other.

It is another object of my invention to provide a fastener having interference thread forming means associated therewith wherein said interference thread forming means is automatically actionable upon the fastener being threaded into the member bore and will produce the desired interference between the fastener and member threads without further manipulation of the fastener. The fastener is particularly formed having expander means associated directly therewith, with said expander means automatically engaging at a predetermined location within the member bore to commence and carry out a radial expansion of a part of the fastener threads into interference with the member threads. The degree of interference produced by said expander means between the fastener threads and the member threads may be predetermined by the particular formation of the expander means and the force used for completing the threadable engagement of the fastener with the member after the expander means has commenced the radial fastener expanding operation.

It is still a further object of my invention to provide a fastener having interference thread forming means associated therewith wherein the expander means producing said interference thread formation may be preassembled with the fastener so as to permit conventional assembly of the fastener in the member bore, thereby producing an assembly time and procedure virtually the same as a conventional fastener of the same general character. No special skills are required and the interference thread forming means is completely automatic and foolproof. Furthermore, said interference thread forming means may be adapted to a multiplicity of fasteners in all sizes, shapes and forms, as well as for use with blind bores or through bores.

It is also an object of my invention to provide a fastener having interference thread forming means associated therewith wherein the interference thread forming means is preformed on the fastener prior to the fastener being assembled with a member threaded bore, whereby, as the fastener is threaded into the member bore, the fastener interference thread forming means distorts the threads of the member during such threading so as to provide the desired interference between the fastener and member. The threads of the fastener are extended beyond the interference thread forming means thereon so that said threads beyond said interference thread forming means constitute lead threads axially drawing the fastener into the member bore during the threading thereof and despite the fact that the fastener interference thread forming means is in tight interference with the threads of the member bore.

Other objects and advantages of the invention will be apparent from the following specification and the accompanying drawing which is for the purpose of illustration only, and in which:

FIG. 5 is a vertical, sectional view showing still another form of fastener incorporating certain of the principles of the present invention; and FIG. 6 is a fragmentary view similar to FIG. 5 and showing the fastener of FIG. 5 engaged in a member bore.

Figure 1:
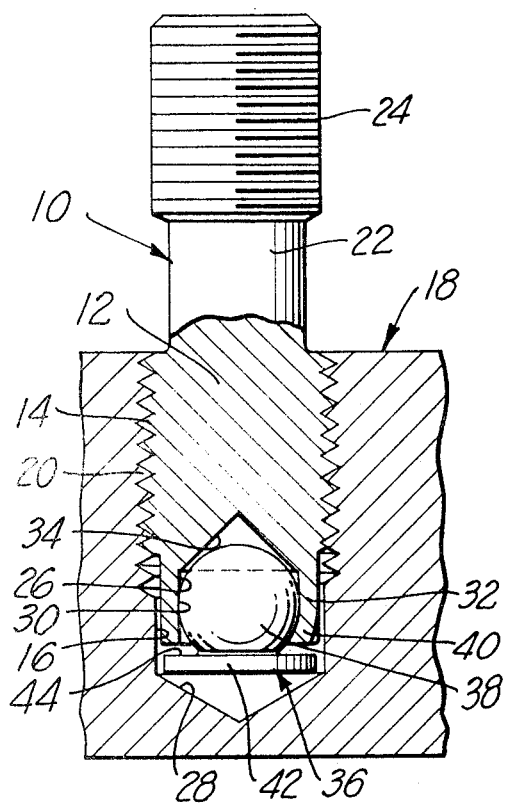
FIG. 1 is a fragmentary, vertical, sectional view showing an embodiment of a fastener incorporating the principles of the present invention, in this case a stud, threadably engaged in a member bore and prior to the automatic actuation of the interference thread forming means thereof.
Figure 2:
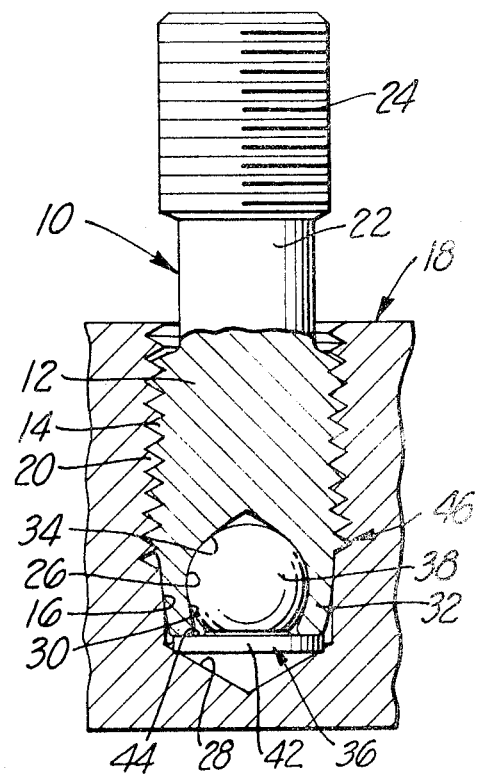
FIG. 2 is a view similar to FIG. 1, but showing the fastener of FIG. 1 after the automatic actuation of the interference thread forming means and with the resulting interference between the fastener threads and the member threads being somewhat exaggerated to more clearly teach the results of the present invention.
Figure 3:
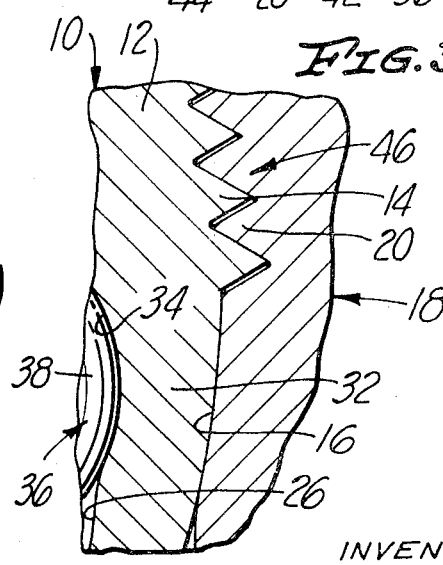
FIG. 3 is an enlarged portion of FIG. 2, and again showing the interference produced between the fastener threads and the member threads greatly exaggerated.

Referring to FIGS. 1 through 3, a fastener in the form of a stud, generally indicated at 10, includes a shank 12 with threads 14, said shank being threadably engaged in a blind bore 16 of a member, generally indicated at 18. The bore 16 of the member 18 is drilled and conventionally tapped the major portion of the length thereof to provide member threads 20 which are engaged with the shank threads 14, said shank threads also being formed in the conventional manner. Furthermore, the stud 10 may have a projecting fastening portion 22 with threads 24 for ultimate use of the stud for any of a multiplicity of uses as a conventional stud.

More particularly to the principles of the present invention, the stud shank 12 is formed with an axially extending, end recess 26 within the stud bore 16 and opening axially toward bottom 28 of said stud bore. The end recess 26 includes cylindrical surfaces 30 forming an annular shank inner end 32, with said cylindrical surfaces 30 terminating inwardly of the end recess in conical and converging surfaces 34. It will be noted that the end recess 26 extends axially into the shank 12 so that at least the recess converging surfaces 34 are located radially inwardly of a part of the shank threads 14 for an important purpose to be hereinafter described.

An expander, generally indicated at 36, is positioned with a generally spherical expanding portion 38 received axially within the shank end recess 26 and the extremities of the shank inner end 32 may be slightly radially inwardly staked or otherwise deformed, as at 40, to retain said spherical expanding portion against displacement from the shank end recess, although free for axial movement therein. The expander 36 further includes an actuating portion 42 secured to the spherical expanding portion 38, said actuating portion preferably projecting radially outwardly from said expanding portion axially outward of the shank end recess 26 and having a generally radially extending abutment surface 44 axially adjacent the extremities of the shank inner end 32.

As shown in FIG. 1, the stud shank 12 is being threadably received in the member bore 16 and the expander actuating portion 42 has not yet contacted the member bore bottom 28 so that the stud threads 14 and the member threads 20 remain in originally cut form and the stud shank is freely threadable into the member bore. Upon the expander actuating portion 42 contacting the member bore bottom 28, however, as shown in FIG. 2, the expander 36 is forced axially into the shank end recess 26 so that the expanding portion 38 of the expander engages the end recess converging surfaces 34, while the shank inner end 32 axially engages the abutment surfaces 44 of the expander actuating portion 42. The final threading of the stud shank 12 into the member bore 16, through the combined working of the spherical expanding portion 38 of the expander 36 against the converging surfaces 34 of the stud end recess 26 and the working of the abutment surfaces 44 of the expander actuating portion 42 axially against the shank inner end 32, causes the extremities of the shank inner end 32 to deform inwardly, while the remainder of the shank inner end is forced radially outwardly, as is that part of the stud 10 radially outwardly from the end recess converging surfaces 34 which is in the area of the last few of the stud threads 14.

Such radial expansion of the shank 12 caused by the expander 36 forces the last few of the stud threads 14 radially into interference with the last few of the member bore threads 20, such condition being shown exaggerated in FIGS. 2 and 3, and indicated generally at 46. The degree of interference between the shank threads 14 and the bore threads 20, as well as between the shank inner end 32 and the member 18 axially inward of said threads, will be dependent upon the force applied to complete the final threading of the shank 12 into the member bore 16, the materials and hardness of the various parts, and the particular formation of the shank end recess 26, all of which can be controlled to produce the interference or the interference with deformation, as desired. For instance, such interference might be relatively slight so that the stud 10 could be ultimately removed from the member bore 16, but would require a force for such removal much greater than that required for original insertion, or the interference may be to the extent of actually providing extreme deformation of the shank 12 and member 18 in the order of that shown, in which case it is impossible to remove the stud shank from the member bore without destruction of either the shank or member.

Depending on the particular application and conditions of such application, both the stud 10 and expander 36 may be formed of one of the usual alloy steels or exotic steels, all heat treated to the desired hardness for the particular conditions. Such hardness may range in the order of 20 to 55 on the Rockwell "C" Scale.

Figure 4:
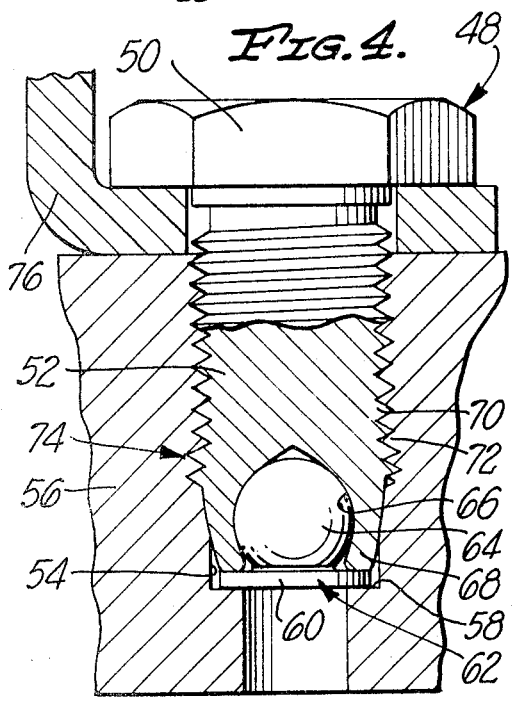
FIG. 4 is a view similar to FIG. 2, but showing another form of fastener incorporating the principles of the present invention and received in a different form of member bore.

Another form of the fastener of the present invention is shown in FIG. 4 as a bolt, generally indicated at 48, having a head 50 and a shank 52 threadably engaged in a through bore 54 of a member 56. In view of the fact that the member bore 54 is a through bore, said bore is formed with an annular shoulder 58 for axial engagement by an actuating portion 60 of an expander 62, having portion 64 received axially within an end recess 66 of a shank inner end 68. The expander 62 and the bolt shank 52 cooperate in the same manner described above relative to the previous stud fastener for providing interference between the bolt shank and the member 56, including interference and even deformation between threads 70 and 72, shown exaggerated at 74, with the exception that the expander actuating portion 60 works axially against the bore shoulder 58.

As shown in FIG. 4, the bolt 48 through said thread interference is permanently secured in the member bore 54, with the bolt head 50 clamping a second member 76 against the member 56. Obviously, where the bolt 48 is used in the manner shown and it is desired to tightly clamp the second member 76, it is necessary to maintain the various dimensioning of the bolt 48, member 56 and second member 76 closely related in order that the desired results may be obtained.

Still another form of fastener incorporating certain of the principles of the present invention is shown in FIG. 5 as a bolt, generally indicated at 78, having a head 80 and a threaded shank 82 terminating in an end recess 84 axially receiving a spherical expander 86. In this instance, prior to any engagement of the bolt 78 in a member bore, shank end portion 88 is pre-formed around the expander 86 so as to initially provide pre-formed interference threads 90 projecting radially from the shank 82 a greater distance than the remainder of the threads on the shank. At the same time, the pre-forming of the shank end portion 88 provides lead threads 92 axially beyond the interference threads 90, that is, at the side of the interference threads axially opposite from the head 80, and said lead threads are of less diameter than the interference threads equal to or slighly less than the diameter of the remainder of the threads on the shank 82.

Thus, when the bolt 78 is threadably received in a normally threaded through-bore 94 of a member 96 with the head 80 securing a second member 98 thereto, the shank interference threads 90 will progressively deform threads 100 of the member bore as the bolt shank 82 moves progressively axially into the member bore so that a final interference will be maintained between the shank interference threads and the member bore threads 100 when the bolt is finally in place. At the same time, during this threaded engagement of the bolt shank 82 within the member bore 94, the shank lead threads 92 will serve to axially draw the bolt shank into the member bore.

It is also possible to form the bolt 78 and, therefore, the bolt shank 82 of a metal having the physical characteristics so that after the pre-formed interference threads 90 are provided by pre-forming the shank end portion 88 around the expander 86, the expander 86 may be removed prior to threading the bolt 78 into the through-bore 94 of member 96. For instance, the volt 78 may be formed of a spring steel with the deformation of the shank end portion 88 around the expander 86 to provide the pre-formed interference threads 90 taking place while said bolt is in a soft, annealed state. Prior to removal of the expander 86, the bolt 78 may then be heat treated to provide the metal with the spring qualities and characteristics so that during removal of the expander 86 from the end recess 84, the shank 82 will merely spring radially outwardly and then return to pre-formed shape so as to not appreciably permanently deform the pre-formed interference threads 90.

The resulting bolt 78 will be virtually identical to that shown in FIG. 5 and will function in substantially the same manner as previously described relative to FIGS. 5 and 6. The springing qualities of the metal of the bolt 78 produced by the prior heat treatment thereof will maintain the shank interference threads 90 in functional form for deforming the threads 100 of the member through-bore 94 in virtually the same manner despite the lack of the expander 86, thereby producing substantially the same results.

Thus, according to the principles of my invention, I have provided a fastener having interference thread forming means associated therewith which may be fabricated in various forms, the examples shown and described herein being the stud 10 and the bolts 48 and 78, all of which include said interference thread forming means automatically operable merely by the conventional threading of the stud 10 or the bolt 48 or 78 into the member bores 16 or 54 or 94. The only requirement for such automatic operation with said stud 10 and bolt 48 is that some means be provided within the particular member bore, whether such bore is the blind bore 16 or the through bore 54, which may be engaged by the expander actuating portion 42 or 60 of the expander 36 or 62. It is obvious, therefore, that the stud 10 of FIGS. 1 through 3 could be similarly used in the member through bore 54 of FIG. 4 and that the bolt 48 of FIG. 4 could be similarly used in the member blind bore 16 of FIGS. 1 through 3. The bolt 78 is automatically operable for forming said thread interference merely through the pre-forming thereof.

Also, it is not absolutely required that the expander 36 or 62 will be retained in the shank end recess 26 or 66 during the threadable engagement of the stud 10 or bolt 48 with the particular member 18 or 56, but rather the particular expander may be first inserted in the member bore to lie against the bore bottom 28 or the bore shoulder 58, with the threadable insertion of the stud or bolt following. The important feature is that the particular expander 36 or 62 will ultimately be received in the stud end recess 26 or the bolt end recess 66 to finally perform the expanding and thread interference function previously described. It is not intended, therefore, to limit the principles of my present invention to the particular forms of fasteners shown but, rather, such forms are merely for illustrative purposes and the principles of my present invention are intended to be broadly construed.

I claim:

1. In a member having a fastener threadably engaged therein, the combination of: a member having a threaded bore therein, shoulder means projecting generally radially inwardly about said member bore axially inwardly of said threads; a fastener having a threaded shank engaged in said member bore, said fastener shank having an end recess formed in an end surface thereof including an enlarged portion extending axially from said end surface and terminating axially inwardly in angularly axially inwardly extending and radially inwardly converging surface means, at least said shank converging surface means projecting axially into radial alignment with a part of said shank threads; and an expander having an expanding portion of less radial dimensions than said enlarged portion of said fastener shank end recess positioned axially movably in said fastener shank end recess and a connected actuating portion axially outwardly adjacent said fastener shank end surface projecting radially outwardly into axial alignment substantially axially abutting said fastener shank end surface axially between said fastener shank end surface and said member bore shoulder means, said expanding portion terminating axially inwardly of said fastener shank end recess in angularly axially inwardly extending and radially inwardly converging surface means axially abutting said converging surface means of said fastener shank end recess, said axially abutting angular surface means of said expanding portion and fastener shank end recess being formed angularly interfering and radially expanding said fastener shank including said part of said shank threads radially into interference with said member bore threads upon said expanding portion being forced axially inwardly of said fastener shank end recess axially pressure engaging said angularly interfering converging surface means, said actuating portion being positioned spaced axially from said converging surface means on said expanding portion substantially the same axial distance as axial spacing of said fastener shank end surface from said converging surface means of said fastener shank end recess providing axial contact between said actuating portion and said member bore shoulder means axially pressure forcing said expanding portion axially inwardly of said fastener shank end recess axially pressure engaging said converging surface means and substantially at the same time providing axial pressure contact between said actuating portion and said fastener shank end surface to at least exert axial pressure against said fastener shank end surface about said fastener shank end recess upon said fastener being threaded into said member bore, said actuating portion axial pressure against said fastener shank end surface aiding said expanding portion in radially expanding said part of said shank threads radially into interference with said member bore threads.

2. A member and fastener as defined in claim 1 in which said expanding portion of said expander is generally spherical and said actuating portion of said expander is generally cylindrical, said cylindrical actuating portion projecting radially outwardly beyond said spherical expanding portion forming a radially exposed and radially angular annular recess therebetween; in which said axial contact between said expander cylindrical actuating portion and said fastener shank end surface exerts axial pressure against said fastener shank about said fastener shank end recess forcing said fastener shank to axially collapse and deform radially inwardly into said expander annular recess during said expanding of said part of said shank threads radially into interference with said member bore threads; and in which said enlarged portion of said fastener shank end recess is a cylindrical portion terminating axially inwardly in an axially inwardly extending conical portion, said conical portion forming said converging surface means.

3. In a fastener adapted for threadable engagement in a member bore, the combination of: a fastener having a threaded shank with an end recess formed in an end surface thereof including an enlarged portion extending axially from said end surface and terminating axially inwardly in angularly axially inwardly extending and radially inwardly converging surface means, at least said shank converging surface means projecting axially into radial alignment with a part of said shank threads; and an expander having an expanding portion of less radial dimensions than said enlarged portion of said fastener shank end recess positioned axially movably in said fastener shank end recess and a connected actuating portion axially outwardly adjacent said fastener shank end surface projecting radially outwardly into axial alignment and substantially axially abutting said fastener shank end surface, said expanding portion terminating axially inwardly of said fastener shank end recess in angularly axially inwardly extending and radially inwardly converging surface means axially abutting said converging surface means of said fastener shank end recess, said axially abutting angular surface means of said expanding portion and fastener shank end recess being formed angularly interfering and radially expanding said fastener shank including said part of said shank threads radially into interference with said member bore threads upon said expanding portion being forced axially inwardly of said fastener shank end recess axially pressure engaging said angularly interfering converging surface means, said actuating portion being positioned spaced axially from said converging surface means of said expanding portion substantially the same axial distance as axial spacing of said fastener shank end surface from said converging surface means of said fastener shank end recess providing axial contact between said actuating portion and an exterior surface tending to axial pressure force said expanding portion axially inwardly of said fastener shank end recess axially pressure engaging said converging surface means and substantially at the same time providing axial pressure contact between said actuating portion and said fastener shank end surface to at least exert axial pressure against said fastener shank end surface about said fastener shank end recess upon said expanding portion being forced axially inwardly of said fastener shank end recess, said actuating portion axial pressure against said fastener shank end surface aiding said expanding portion in radially expanding said part of said shank threads.

4. A fastener as defined in claim 3 in which said expanding portion of said expander is generally spherical and said actuating portion of said expander is generally cylindrical, said cylindrical actuating portion projecting radially outwardly of said spherical expanding portion forming a radially exposed and radially angular annular recess therebetween; in which said exertion of said axial pressure against said fastener shank about said fastener shank end recess by said expander cylindrical actuating portion axially collapses and deforms said fastener shank into said expander annular recess during said radial expansion of said part of said shank threads; and in which said enlarged portion of said fastener shank end recess is a cylindrical portion terminating axially inwardly in a conical portion forming said converging surface means.

References Cited
UNITED STATES PATENTS

| | | | |
|---|---|---|---|
| 806,156 | 12/1905 | Marshall | 151—22 |
| 1,151,779 | 8/1915 | Gerlitzki | 151—31 |
| 1,523,932 | 1/1925 | Davies. | |
| 2,549,823 | 4/1951 | Kost. | |
| 2,770,276 | 11/1956 | Broder | 151—31 |
| 3,212,547 | 10/1965 | McKay et al. | 151—14 |
| 751,902 | 2/1904 | Dodge | 85—82 |
| 1,372,291 | 3/1921 | Jacobs | 85—77 |

FOREIGN PATENTS

| | | |
|---|---|---|
| 40,111 | 1965 | Germany. |

RAMON S. BRITTS, Primary Examiner

U.S. Cl. X.R.

85—83; 151—31